(12) United States Patent
Palermiti, II

(10) Patent No.: US 10,013,144 B2
(45) Date of Patent: Jul. 3, 2018

(54) VISUAL PREVIEW OF SEARCH RESULTS

(71) Applicant: Microsoft Technology Licensing, LLC, Redmond, WA (US)

(72) Inventor: Michael F. Palermiti, II, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/543,809

(22) Filed: Nov. 17, 2014

(65) Prior Publication Data

US 2015/0095850 A1    Apr. 2, 2015

Related U.S. Application Data

(63) Continuation of application No. 12/916,286, filed on Oct. 29, 2010, now Pat. No. 8,892,578.

(51) Int. Cl.
  *G06F 17/30* (2006.01)
  *G06F 3/0482* (2013.01)
  *G06F 3/0488* (2013.01)

(52) U.S. Cl.
  CPC .......... *G06F 3/0482* (2013.01); *G06F 3/0488* (2013.01); *G06F 17/30058* (2013.01); *G06F 17/30554* (2013.01); *G06F 17/30651* (2013.01); *G06F 17/30713* (2013.01)

(58) Field of Classification Search
  CPC .......... G06F 17/3079; G06F 17/30817; G06F 17/30831; G06F 17/3084; G06F 17/30852; G06F 17/30058; G06F 17/30651; G06F 17/30713; G06F 17/30554; G06F 17/30864

USPC .................................................. 707/754, 758
See application file for complete search history.

(56) References Cited

U.S. PATENT DOCUMENTS

| | | | |
|---|---|---|---|
| 7,293,066 B1 * | 11/2007 | Day .................. | G06Q 30/0603 709/213 |
| 2002/0152267 A1 * | 10/2002 | Lennon ........................ | 709/203 |
| 2011/0175932 A1 * | 7/2011 | Yu ............................ | G06F 3/013 345/661 |
| 2011/0197153 A1 * | 8/2011 | King et al. .................... | 715/769 |

* cited by examiner

*Primary Examiner* — James Trujillo
*Assistant Examiner* — Fariborz Khoshnoodi
(74) *Attorney, Agent, or Firm* — Workman Nydegger

(57) ABSTRACT

Many software applications allow users to consume and interact with a variety of data, such as files, photos, web pages, emails, and/or other content. Because the amount of content may be cumbersome to sift through, software applications may provide filtering and searching capabilities to aid users in finding desired content. However, the trial and error involved in current searching techniques may be time consuming and/or diminish the user's experience. Accordingly, one or more systems and/or techniques for presenting visual previews of search results are disclosed herein. In particular, a user may reference an identifier (e.g., "Bill") that may be used as search criteria to retrieve corresponding objects (e.g., photos of Bill). A visual preview of the retrieved objects may be presented to the user. The user may quickly view visual previews of search results by referencing various identifiers without committing to a particular search result set.

20 Claims, 13 Drawing Sheets

VISUAL PREVIEW OF SEARCH RESULTS

RELATED APPLICATION

This application is a continuation of U.S. patent application Ser. No. 12/916,286, filed on Oct. 29, 2010, entitled "VISUAL PREVIEW OF SEARCH RESULTS," at least some of which may be incorporated herein.

BACKGROUND

Today, software applications provide rich filtering and searching capabilities for a variety of data. In one example, an email application may allow users to filter emails by date received, sender, subject, etc. In another example, a photo gallery web application may allow users to filter photos based upon date uploaded, people tagged within the photos, user rating, color, etc. Such filters may improve a user's search experience by narrowing a large amount of data into manageable sets of search results. Unfortunately, the process of filtering/searching may result in extensive trial and error for the user. For example, a user may attempt to locate an email sent by someone having the first name Dan about 5 to 9 months ago. At first, the user may choose a "date" filter (e.g., date=past year), and then commit a search query using the "date" filter. Unfortunately, the user may clear/dismiss the search results, and start over because the search results may comprise a large amount of emails that may be burdensome to sift through. Starting over, the user may choose a different filter, such as a "sender" filter (e.g., sender="Dan"), and then commit a search query using the "sender" filter. Again the search results may comprise a large amount of emails that may not be helpful. The search, clear, new search cycle may be repeated multiple times before the desired email is found. This type of user experience may be cumbersome, require a large number of user inputs (e.g., mouse clicks), and may diminish the user's confidence and satisfaction with application's overall search experience.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for presenting a visual preview are disclosed herein. In particular, visual previews of search results may be presented. Many software applications, such as email applications, online photo gallery web applications, social networks, and/or other content driven applications, may provide filtering and/or searching capabilities. Currently, a user may repetitively: invoke a search; view search results; clear undesirable search results; invoke a new search; etc. over and over until a desired search result set is retrieved. Accordingly, as provided herein, visual previews of objects may be provided to users based upon users referencing identifiers corresponding to filter/search criteria. In particular, a user may reference an identifier (e.g., Sender="Dan") that may be used as search criteria to retrieve objects (e.g., emails), which may be presented within a visual preview (e.g., a preview of emails sent by Dan). The user may quickly view visual previews of objects by referencing various identifiers without committing to a particular search result set.

It may be appreciated that a visual preview may be presented in response to a user referencing an identifier, as opposed to the user invoking/selecting the identifier. For example, a ribbon user interface may comprise gallery menus (e.g., Sender gallery, Subject gallery, Date gallery, etc.). A gallery menu may comprise a set of identifiers (e.g., a plurality of date identifiers within a Date gallery). The gallery menu may allow the user to hover over and/or select identifiers corresponding to search filters within the gallery menu (e.g., a Date gallery may comprise date identifiers that may be used as search filters). It may be appreciated that an identifier may be referenced is a variety of ways. In one example, an identifier may be referenced by user input hovering over an identifier with a cursor (e.g., an identifier March may be hovered over within a Date gallery). In response to the referencing, a visual preview of objects corresponding to the identifier may be presented (e.g., a visual preview of emails received during March). Additionally, the identifier may be unreferenced by hovering off the identifier, for example. In response to the unreferencing, the visual preview may be removed. Thus, the user may quickly preview visual previews of search results by referencing various identifiers without committing to a particular search result set.

In one example, a first user input comprising a referenced identifier may be received. For example, a user may have referenced (e.g., hovered over) an identifier (Genre="Jazz") within a music genre gallery menu of a music application. One or more objects, such as music files, may be retrieved using the referenced identifier (Genre="Jazz") as search criteria. For example, the word "Jazz" may be used to search for music files having a category of Jazz, which may be specified within metadata. It may be appreciated that the user may subsequently reference other identifiers in order to see other visual previews. In this way, a first visual preview of the one or more music files may be presented without the user committing to search results based upon a full search using the identifier (Genre="Jazz").

It may be appreciated that various user input may be received. In a first example, a second user input unreferencing the referenced identifier may be received. For example, the user may hover off the identifier (Genre="Jazz") within the music genre menu. In response to the unreferencing, the presentation of the first visual preview may be removed. In a second example, a second user input selecting the referenced identifier may be received. In this way, the user may commit to search results based upon the selected identifier. Thus, a persisted view of the one or more objects may be presented. The persisted view may comprise standard search result objects that may persist even though certain user input, such as a user hovering off the selected identifier, may occur. In contrast, a visual preview may comprise a temporary view of search results that may be presented until the user unreferences (hovers off) the selected identifier. In a third example, a second user input comprising a new referenced identifier may be received (e.g., the user hovers off of identifier (Genre="Jazz") and hovers over a new/different identifier (Genre="Hard Rock")). One or more new objects may be retrieved by using the new referenced identifier as search criteria. The presentation of the first visual preview corresponding to "Jazz" may be removed, while a presentation of a second visual preview corresponding to "Hard Rock" may be presented.

It may be appreciated that subsequent user input referencing various identifiers may be received. In this way, the user may quickly and easily view corresponding visual previews of search results without committing to a particular search. For example, a user may desire a particular file, however, the user may merely know that the file was created by a person at work (e.g., the user may work with 6 individuals). Instead of performing potentially 6 or more separate file searches using the individual's names, the user may quickly mouse over name identifiers of the co-workers until a desired search results set is presented within a visual preview (e.g., a visual preview comprising the desired file). Thus, the user may commit to merely a single search to find the desired search result set.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
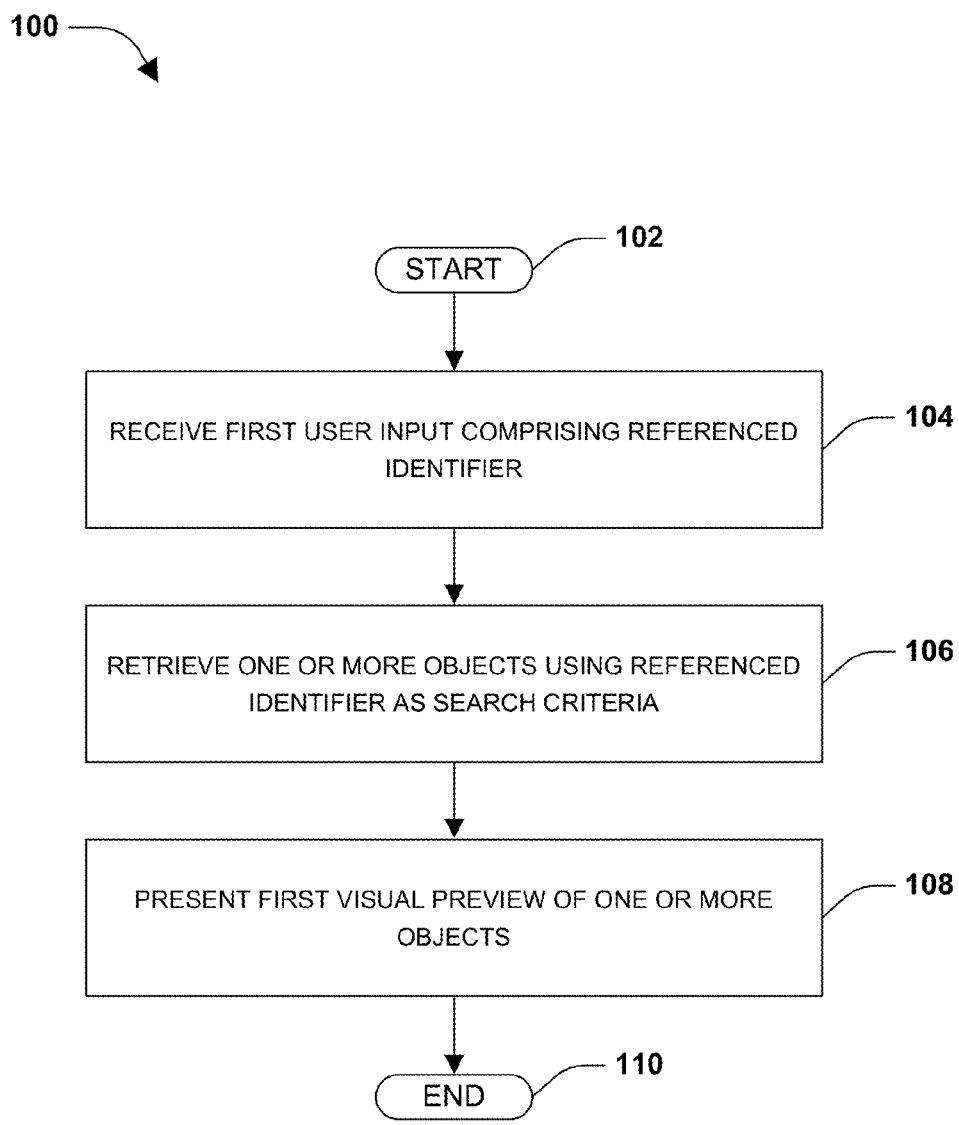
FIG. 1 is a flow chart illustrating an exemplary method of presenting a visual preview.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many software applications are driven by an ever increasing amount of content. For example, a computing environment may comprise hundreds of thousands of objects ranging from system files to user generated files, such as photos, text documents, music files, spreadsheet documents, application files, etc. Similarly, a web computing environment, such as a photo sharing webpage, may comprise millions of photos uploaded by users. To facilitate searching and consumption of desired content by users, it may be advantageous to provide tools for organizing, searching, filtering, and/or presenting such content. In this way, users may quickly locate desired content, as opposed to sifting through very large amount of content.

Current software applications may allow users to filter and/or search content. For example, an email application may comprise one or more fields into which a user may enter one or more search and/or filtering queries (e.g., date, size, name, etc.). As a result, objects, such as files, corresponding to the entered query may be presented as search results in a persisted view. Unfortunately, the search results may not comprise objects desired by the user (e.g., the user is unsure of the particular date the desired file was created). Thus, the user may clear the search results, enter a different query into the same or different field(s), and commit to a different search over and over until search results comprising the desired object(s) are returned. This trial and error search process may lead to excessive input, wasted time, and/or frustration of the user.

Accordingly, one or more systems and/or techniques for presenting a visual preview are provided herein. In particular, a visual preview of objects corresponding to a referenced identifier (a search filter criteria) may be presented. For example, user input comprising a referenced identifier may be received. The referenced identifier may be used as search criteria to retrieve one or more objects. A visual preview of the one or more objects may be presented. In this way, the user may quickly reference various identifiers (e.g., hover from one identifier to the next) to sequentially view various visual previews of search results without committing to a particular search. It may be appreciated that the terms identifier, search filter criteria, and/or search criteria may, at times, be used interchangeably.

As used herein, the term object refers generally to a wide variety of content, such as files, photos, music files, spreadsheet data, database entries, descriptive data, emails, hyperlinks, URLs, text, and/or other content. The term identifier refers generally to search criteria or search filter that may be used to retrieve objects corresponding to the identifier. In one example, a date gallery menu may comprise a set of date identifiers (e.g., Jan, Feb, Mar, etc.) that may be used to as search criteria to retrieve objects, such as files, corresponding to a particular date identifier. For example, a user may reference an identifier (Creation Date="Jan"), which may be used to generate a visual preview of files created in January. It may be appreciated that a visual preview may be generated based upon (light-weight) user input referencing an identifier (e.g., cursor hover over action), as opposed to (more burdensome) user input selecting the identifier (e.g., typing in a query followed by a commit or enter keystroke). Thus, a user may hover between identifiers to view various visual previews without committing to a particular search. Accordingly, much more light-weight, user friendly and intuitive searching that allows a user to quickly and efficiently navigate into and out of one or more search result previews without having to laboriously query for and commit to the results is provided herein.

One embodiment of presenting a visual preview is illustrated by an exemplary method 100 in FIG. 1. At 102, the method starts. At 104, a first user input comprising a referenced identifier may be received. For example, a user may perform a hover over action of a user interface element representing an identifier using a cursor within an email application. For example, a user may reference an identifier (From="Dan") to view a visual preview of emails sent from Dan.

It may be appreciated that a variety of actions may be deemed as referencing an identifier, as opposed to selecting an identifier. In one example, an identifier may be referenced based upon a particular gesture on a touch sensitive screen, as opposed to other gestures. In another example, an identifier may be referenced based upon a single click using a cursor, as opposed to a double click. In another example, an identifier may be referenced based upon a hover over action using a cursor, as opposed to a single click. In this way, a variety of (light-weight) inputs may be designated as either referencing or selecting an identifier.

At 106, one or more objects, such as files, photos, emails, web content, text, URLs, hyperlinks, and/or other objects, may be retrieved using the referenced identifier as search criteria. For example, a file system may comprise a plurality of files having associated metadata describing the respective files. The referenced identifier may be used as search criteria for retrieving objects comprising metadata matching the search criteria. For example, the referenced identifier (Name="temp") may be used as search criteria to retrieve files having names comprising the text "temp".

At 108, a first visual preview of the one or more objects may be presented. In one example, the visual preview may comprise a representation of retrieved objects or portions thereof, a subset of retrieved objects or portions thereof, etc. (e.g., thumbnails of photos, full sized photos, a listing of all files, a listing of less than all files, a listing of emails, a listing of hyperlinks, a preview of web content, etc.). The visual preview may differ from a persisted view of search results because the visual preview may be a temporary preview of what search results may be returned if the user selected the referenced identifier. Thus, the user may preview various visual previews before selecting a particular identifier to commit to a corresponding search result set. Because a user may reference an identifier more than once over a period of time, visual previews may be cached within memory to mitigate unnecessary retrieval of objects that are already represented by a visual preview.

It may be appreciated that subsequent user input may be received. In a first example, a user may unreference the referenced identifier. The referenced identifier may be unreferenced by user input moving a cursor off of the referenced identifier, moving the cursor out of a gallery menu comprising the referencing identifier, moving the cursor out of a ribbon gallery menu comprising the gallery menu, and/or other actions. In a second example, a user may reference a new referenced identifier, for example, by moving a cursor from the referenced identifier to the new referenced identifier without leaving a ribbon gallery menu. In third example, a user may select the referenced identifier (e.g., click the referenced identifier) to perform a standard search for persisted search results. It may be appreciated that a variety of subsequent user input is contemplated.

In a first example of subsequent user input, a second user input unreferencing the referenced identifier may be received. For example, the user may perform a hover off action of a user interface element representing the referenced identifier. In response to the unreferencing, the presentation of the first visual preview may be removed. The first visual preview is removed based upon the temporary nature of visual previews. In contrast, a persisted view of search results may persist when the user hovers off the identifier and/or performs other actions.

In a second example of subsequent user input, a second user input comprising a new referenced identifier may be received. For example, the user may hover off of the referenced identifier within gallery menu, and hover over the new referenced identifier the same or different galley menu. One or more new objects may be retrieved using the new referenced identifier as search criteria. It may be appreciated that the one or more of the one or more new objects may be the same or different than one or more of the one or more objects there were previously retrieved based upon the first user input. The presentation of the first visual preview may be removed, while a second visual preview of the one or more new objects may be presented. In this way, the user may quickly view various visual previews by hovering amongst identifiers.

In a third example of subsequent user input, a second user input selecting the referenced identifier may be received. For example, the user may perform a click action upon a user interface element representing the identifier. A standard search for objects corresponding to the selected identifier may be retrieve. A persisted view of the one or more objects may be presented. The persisted view may persist even though the user may perform other actions, such as hovering off the selected identifier, navigating search result objects within the persisted view, and/or other actions. For example, the user may move a cursor around and/or interact with objects or menus without the persisted view being removed.

A third user input comprising a new referenced identifier may be received. The persisted view may be filtered based upon the new referenced identifier to generate a second visual preview. The presentation of the persisted view may be removed, and the second visual preview of the filtered persisted view may be presented. It may be appreciated that the second visual preview may comprise the same temporary attributes as a visual preview (as opposed to a persisted view). A fourth user input unreferencing the new referenced identifier may be received. The presentation of the second visual preview of the filtered persisted view may be removed, and the persisted view of the one or more objects (unfiltered) may be presented. In this way, the user may quickly view visual previews of filters applied to persisted search results by referencing various identifiers without committing to a particular filter. At 110, the method ends.

Figure 2:
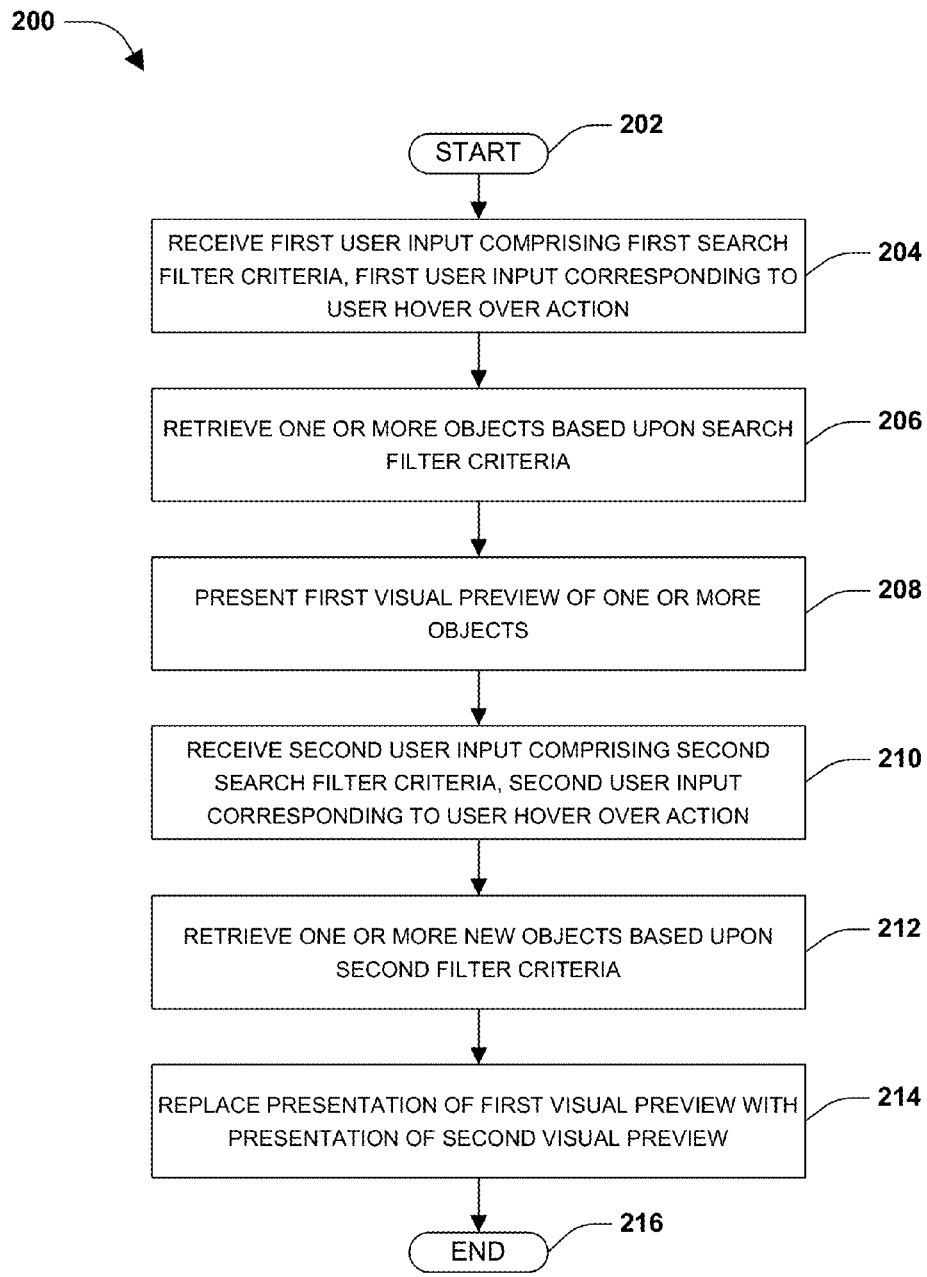
FIG. 2 is a flow chart illustrating an exemplary method of presenting a visual preview.

One embodiment of presenting a visual preview is illustrated by an exemplary method 200 in FIG. 2. At 202, the method starts. At 204, a first user input comprising a first search filter criteria (e.g., an identifier listed within a gallery menu) may be received. The first user input may correspond to a user hover over action. For example, a user may have hovered over a user interface element representing the first search filter criteria. It may be appreciated that the terms search filter criteria and identifier may be used interchangeably to refer to an identifier that may be used as a filter and/or search criteria. At 206, one or more objects may be retrieved based upon the search filter criteria. At 208, a first visual preview of the one or more objects may be presented. At 210, a second user input comprising a second search filter criteria may be received. The second user input may correspond to a user hover over action. For example, the user may have hovered off of the first search filter criteria, and hovered onto the second search filter criteria within a gallery menu. At 212, one or more new objects may be retrieved based upon the second filter criteria. It may be appreciated that one or more of the one or more new objects may be the same or different than one or more of the one or more objects retrieved using the first search filter criteria. At 214, the presentation of the first visual preview may be replaced with a presentation of the second visual preview. At 214, the method ends.

Figure 3:
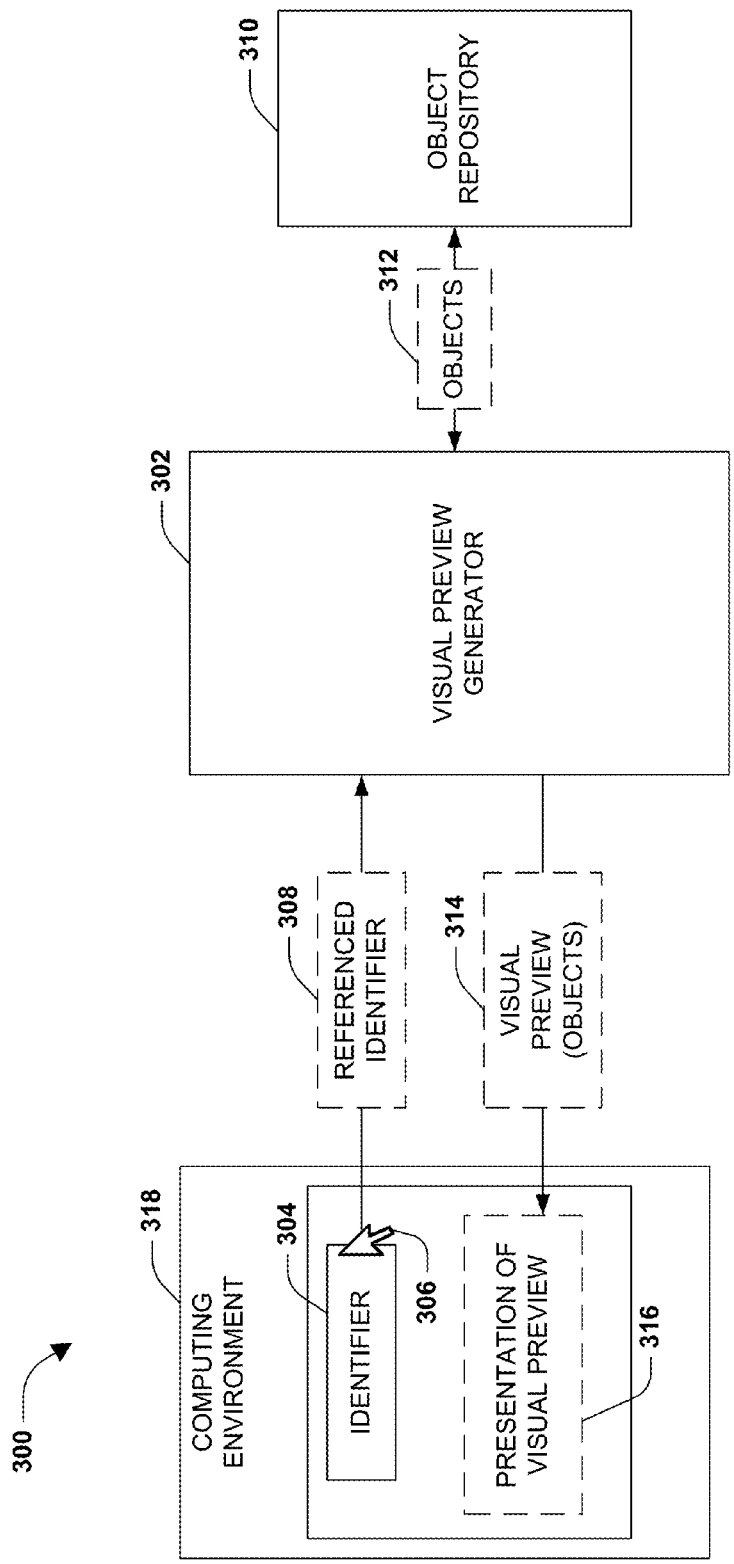
FIG. 3 is a component block diagram illustrating an exemplary system for presenting a visual preview.

FIG. 3 illustrates an example of a system 300 configured for presenting a visual preview. The system 300 may comprise a visual preview generator 302 configured to present visual previews. In one example, the visual previews may be presented within a computing environment 318, such as a desktop application, a desktop operating system, a web browser, a web application, a mobile operating system, and/or other applications.

The visual preview generator 302 may be configured to receive a first user input comprising a referenced identifier 308. For example, a user may hover over an identifier 304 within a menu associated with the computing environment 318 using a cursor 306. The visual preview generator 302 may retrieve one or more objects 312 using the referenced identifier 308 as search criteria. In one example, the one or more objects may be retrieved from an object repository 310 (e.g., a database, one or more folders within a local file system, a remote file server, a spreadsheet, a text file, and/or a variety of data structures and/or memory devices). In one example, objects comprising metadata matching the search criteria may be retrieved from the object repository 310. The visual preview generator 302 may present a first visual preview 314 comprising the one or more objects (presentation of the visual preview 316). Because a user may reference an identifier more than once over a period of time, the visual preview generator 302 may cache visual previews within memory to mitigate unnecessary retrieval of objects that are already represented within a visual preview.

It may be appreciated that the visual preview generator 302 may be configured to receive and/or process subsequent user input. In a first example of subsequent user input, the visual preview generator 302 may receive a second user input unreferencing the referenced identifier 308. For example, the user may have moved the cursor 306 off of the identifier 304. In response to the unreferencing, the visual preview generator 302 may remove the presentation of the visual preview 316.

In a second example of subsequent user input, the visual preview generator 302 may receive a second user input comprising a new referenced identifier. For example, the user may have moved the cursor 306 off of the identifier 304, and onto a new identifier not illustrated. In response to the second user input, the visual preview generator 302 may retrieve one or more new objects using the new referenced identifier as search criteria. The visual preview generator 302 may remove the presentation of the first visual preview 316, and present a second visual preview of the one or more new objects. In this way, the user may view various visual previews by referencing corresponding identifiers without committing to a particular search results set.

It a third example of subsequent user input, the visual preview generator 302 may receive a second user input selecting the referenced identifier. For example, the user may have clicked the identifier 304 with the cursor 306. In response to the selection, the visual preview generator 302 may present a persisted view of the one or more objects. Additionally, the visual preview generator 302 may be configured to receive a third user input comprising a new referenced identifier. In response to the third user input, the visual preview generator 302 may filter the persisted view based upon the new referenced identifier to generate a second visual preview of the filtered persisted view. For example, the persisted view may comprise photos filtered based upon an identifier (Person="Colleen"), such that photos within the persisted view depict Colleen. The persisted view of photos depicting Colleen may be filtered based upon a new referenced identifier (Person="Jim"). Thus, a second visual preview of photos depicting both Colleen and Jim may be generated. The visual preview generator 302 may remove the presentation of the persisted view (photos of Colleen), and present the second visual preview of the filtered persisted view (photos of Colleen and Jim). The visual preview generator 302 may be configured to receive a fourth user input unreferencing the new referenced identifier. For example, the user may move the cursor 306 off of the new referenced identifier (Person="Jim") because the user may have determined that the desired photo does not comprise both Jim and Colleen, but merely Colleen. In response to the unreferencing, the visual preview generator 302 may remove the presentation of the second visual preview of the filtered persisted view, and present the persisted view of the one or more objects.

Figure 4:
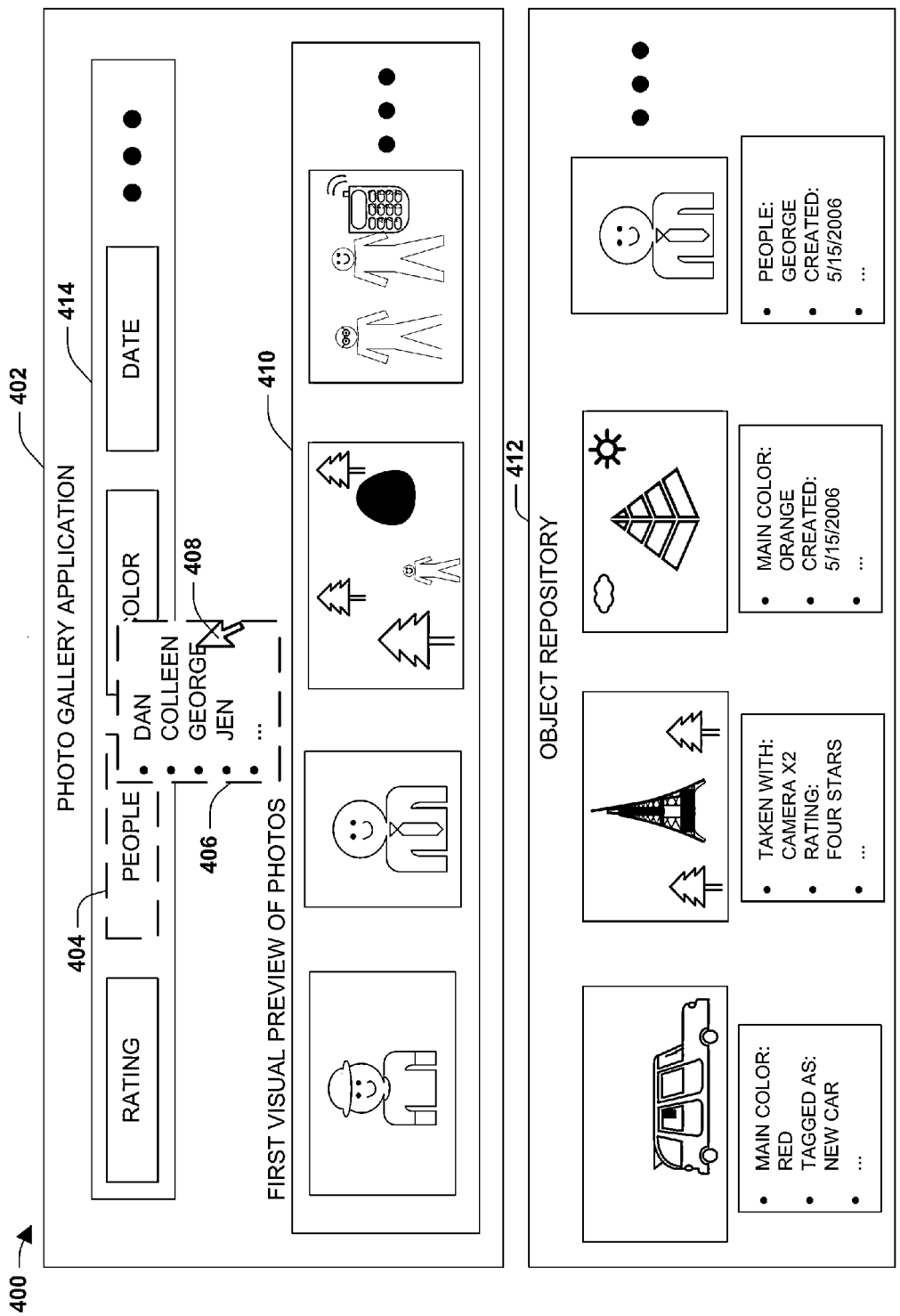
FIG. 4 is an illustration of an example of presenting a first visual preview of photos within a photo gallery application.

FIG. 4 illustrates an example 400 of presenting a first visual preview of photos 410 within a photo gallery application 402. In one example, the photo gallery application 402 may provide a user with the ability to upload, view, organize, share, and/or perform other various tasks with photo objects. The photo gallery application 402 may have access to an object repository 412 (e.g., a local file folder, a remote file server, a database, etc.) comprising photo objects associated with the user. In one example, one or more of the photo objects may comprise metadata that may be used by the photo gallery application 402 to locate desired photo objects during searches. For example, a car photo object may comprise metadata specifying the main color of the car photo object as red, a tagged object within the photo as new car, and/or other information.

The photo gallery application 402 may comprise a ribbon user interface menu 414 that may allow the user to filter and/or search photo objects. The ribbon user interface menu 414 may comprise gallery menus, such as rating gallery, people gallery 404, color gallery, date gallery, and/or other galleries not illustrated. A gallery menu may comprise a set of identifiers that may be used as search criteria to retrieve photo objects corresponding to the respective identifiers. For example, the people gallery 404 may comprise a set of identifiers 406, such as (People="Dan"), (People="Colleen"), (People="George"), (People="Jen"), and/or other identifiers not illustrated.

In one example, a user may have a plurality of personal photos stored within the object repository 412. For example, the object repository 412 may comprise photos of the user's new car, vacations of the user, photos of friends and family, and/or thousands of other photos. The user may utilize the photo gallery application 402 to locate photos depicting the user's vacation to a national forest 2 years ago. Unfortunately, the photos may not be organized such that the user's vacation photos are readily available. However, the user may remember that one of the photos may depict a friend George near the lake. Thus, the user may begin the search by hovering over the people gallery 404 within the ribbon user interface menu 414 with a cursor. In response to hovering over the people gallery 404, the set of identifiers 406 may be presented to the user. The user may reference 408 the identifier (People="George") by hovering over the identifier (People="George") with the cursor. The identifier (People="George") may be used as search criteria to retrieve one or more photo objects depicting George. In this way, the first visual preview of photos 410 comprising photos depicting George may be presented without the user committing to a particular search with persisted search results.

Subsequently, the user may determine that more photos were taken with Jen than George during the national forest vacation. Thus, the user may reference a new identifier (People="Jen") by hovering off the identifier (People="George"), and hovering onto the new identifier (People="Jen"). In response to referencing the new identifier, the first visual preview of photos 410 may be replaced with a second visual preview comprising photos depicting Jen. The switching of visual previews allows the user to quickly view visual previews of photos relating to a variety of people, ratings, colors, dates, and/or other identifiers by referencing various identifiers without committing to a particular search result set.

Figure 5:
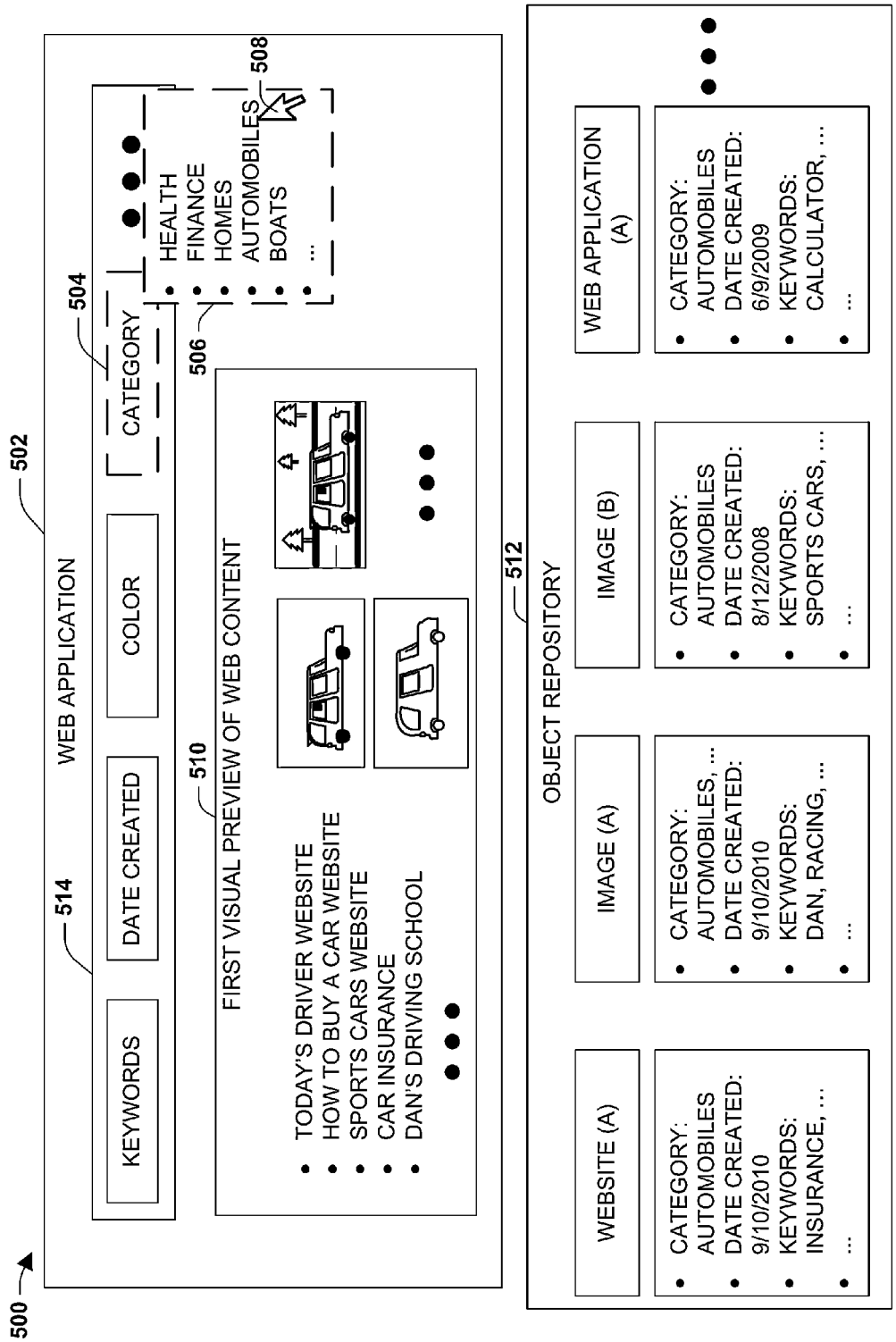
FIG. 5 is an illustration of an example of presenting a first visual preview of web content within a web application.

FIG. 5 illustrates an example 500 of presenting a first visual preview of web content 510 within a web application 502. In one example, the web application 502, such as a web browsing application, may provide users with the ability to search and/or perform other various tasks relating to web content objects, such as images, hyperlinks, website URLs, web applications, and/or other web data. The web application 502 may have access to an object repository 512 (e.g., various web content providers throughout the internet). In one example, one or more of the web content objects may comprise metadata that may be used by the web application 502 to locate desired web content objects during searches. For example, a website (A) may comprise metadata specifying the category as automobiles, the creation date as Sep. 10, 2010, a keyword as insurance, and/or other information.

The web application 502 may comprise a ribbon user interface menu 514 that may allow the user to filter and/or search web content objects. The ribbon user interface menu 514 may comprise gallery menus, such as keywords gallery, date created gallery, color gallery, category gallery 504, and/or other galleries not illustrated. A gallery menu may comprise a set of identifiers that may be used as search criteria to retrieve web content corresponding to the respective identifiers. For example, the category gallery 504 may comprise a set of identifiers 506, such as (Category="Health"), (Category="Finance"), (Category="Homes"), (Category="Automobile"), (Category="Boats"), and/or other identifiers not illustrated.

In one example, a user may desire information on cars. The user may utilize the web application 502 to locate web content relating to automobiles. The user may hover over the category gallery 504 within the ribbon user interface menu 514 with a cursor. In response to hovering over the category gallery 504, the set of identifiers 506 may be presented to the user. The user may reference 508 identifier (Category="Automobiles") by hovering over the identifier (Category="Automobiles") with the cursor. The identifier (Category="Automobiles") may be used as search criteria to retrieve web content relating to automobiles (e.g., a URL to an insurance website, images of cars, a car cost calculator web application, etc.). In this way, the first visual preview of web content 510 may be presented without the user committing to a particular search with persisted search results.

Subsequently, the user may realize that information regarding car loans may be advantage to know before choosing a car. Thus, the user may reference a new identifier (Category="Finance") by hovering off the identifier (Category="Automobiles"), and hovering onto the new identifier (Category="Finance"). In response to referencing the new identifier, the first visual preview of web content 510 may be replaced with a second visual preview comprising web content relating to finance. The switching of visual previews allows the user to quickly view visual previews of web content relating to a variety of keywords, creation dates, colors, categories, and/or other identifiers by referencing various identifiers without committing to a particular search result set.

Figure 6:
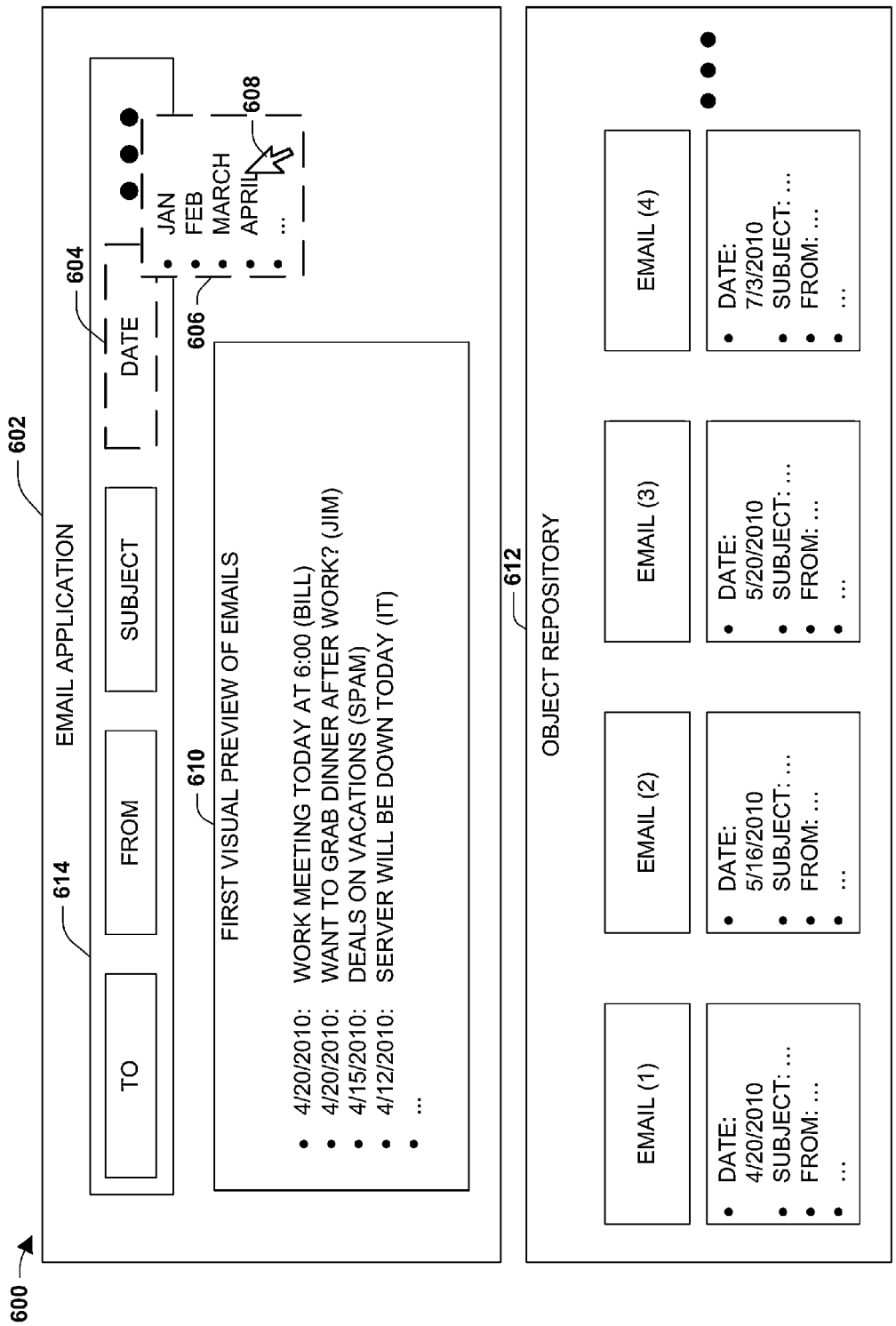
FIG. 6 is an illustration of an example of presenting a first visual preview of emails within an email application.

FIG. 6 illustrates an example 600 of presenting a first visual preview of emails 610 within an email application 602. In one example, the email application 602 may provide users with the ability to create, send, receive, view, organize, and/or perform other various tasks with email objects. The email application 602 may have access to an object repository 612 (e.g., an email server, a local email storage, etc.). In one example, one or more of the email objects may comprise metadata that may be used by the email application 602 to locate desired email objects during searches. For example, an email (1) object may comprise metadata specifying date received, subject, from, and/or other properties or fields of email (1) object.

The email application 602 may comprise a ribbon user interface menu 614 that may allow the user to filter and/or search email objects. The ribbon user interface menu 614 may comprise gallery menus, such as a to gallery, from gallery, subject gallery, date gallery 604, and/or other galleries not illustrated. A gallery menu may comprise a set of identifiers that may be used as search criteria to retrieve email corresponding to the respective identifiers. For example, the date gallery 604 may comprise a set of identifiers 606, such as (Date="Jan"), (Date="Feb"), (Date="March"), (Date="April"), and/or other identifiers not illustrated.

In one example, a user may desire an email that may have been received sometime between March and June. The user may begin the search by hovering over the date gallery 604 within the ribbon user interface menu 614 with a cursor. In response to hovering over the date gallery 604, the set of identifiers 606 may be presented to the user. The user may reference 608 identifier (Date="April") by hovering over the identifier (Date="April") with the cursor. The identifier (Date="April") may be used as search criteria to retrieve emails received in April. In this way, the first visual preview of emails 610 may be presented without the user committing to a particular search with persisted search results.

Subsequently, the user may become frustrated because the first visual preview of emails 610 may comprise too many emails to sift through. Thus, upon remembering the subject may have comprised the text "insurance", the user may reference a new identifier (Subject="insurance") by hovering off the identifier (Date="April"), and hovering onto the new identifier (Subject="insurance"). In response to referencing the new identifier, the first visual preview of emails 610 may be replaced with a second visual preview comprising emails having subjects with the text "insurance". The switching of visual previews allows the user to quickly view visual previews of web content relating to a variety of search criteria by referencing various identifiers without committing to a particular search result set.

Figure 7:
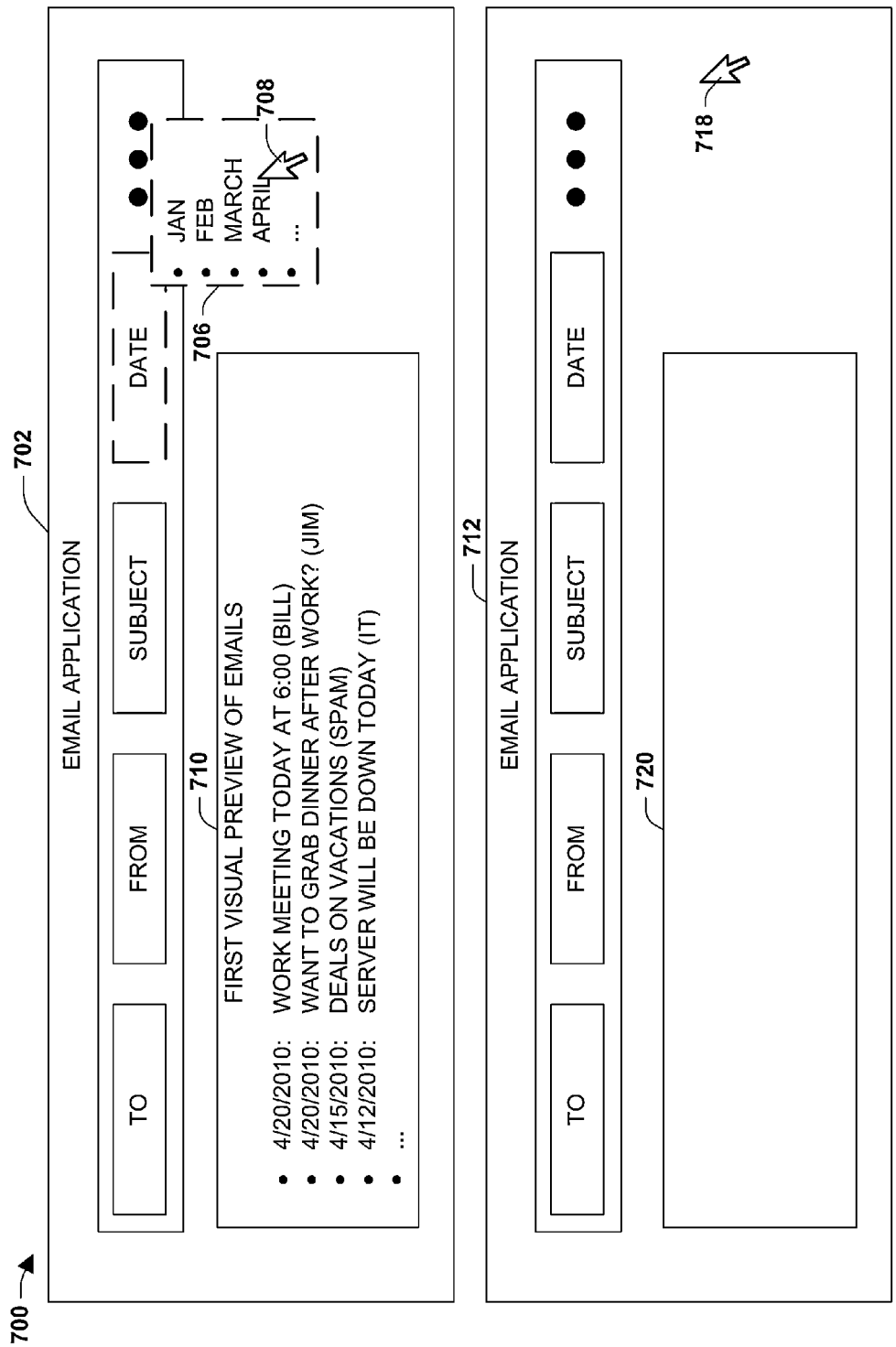
FIG. 7 is an illustration of an example of an email application in a first state after an identifier is referenced, and the email application in a second state after the referenced identifier is unreferenced.

FIG. 7 illustrates an example 700 of an email application in a first state 702 after an identifier is referenced, and the email application in a second state 712 after the referenced identifier is unreferenced. The email application may comprise a ribbon user interface that may allow a user to filter and/or search emails. The ribbon user interface may comprise gallery menus (e.g., date gallery). A gallery menu may comprise a set of identifiers (e.g., set of date identifiers 706) that may be referenced by user input to view visual previews; unreferenced by user input to remove visual previews; and/or selected by user input to perform a particular search for persisted search results.

In one example, a user may desire a particular email. The user may begin the search by hovering over the date gallery with a cursor to view the set of date identifiers 706. The user may reference 708 identifier (Date="April") by hovering over the identifier (Date="April"). In response to the user input referencing the identifier (Date="April"), a first visual preview of emails 710 may be presented. In this way, the email application may be in the first state 702, where the first visual preview of emails 710 is presented based upon the user referencing the identifier (Date="April").

Subsequently, the user may unreference 718 the identifier (Date="April") by hovering off the identifier (Date="April"), the date gallery, and/or the ribbon user interface. In response to the user input unreferencing the identifier (Date="April"), the first visual preview may be removed 720. In this way, the email application may be in the second state 712, where the first visual preview of emails is removed 720 based upon the user unreferencing 718 the identifier (Date="April").

Figure 8:
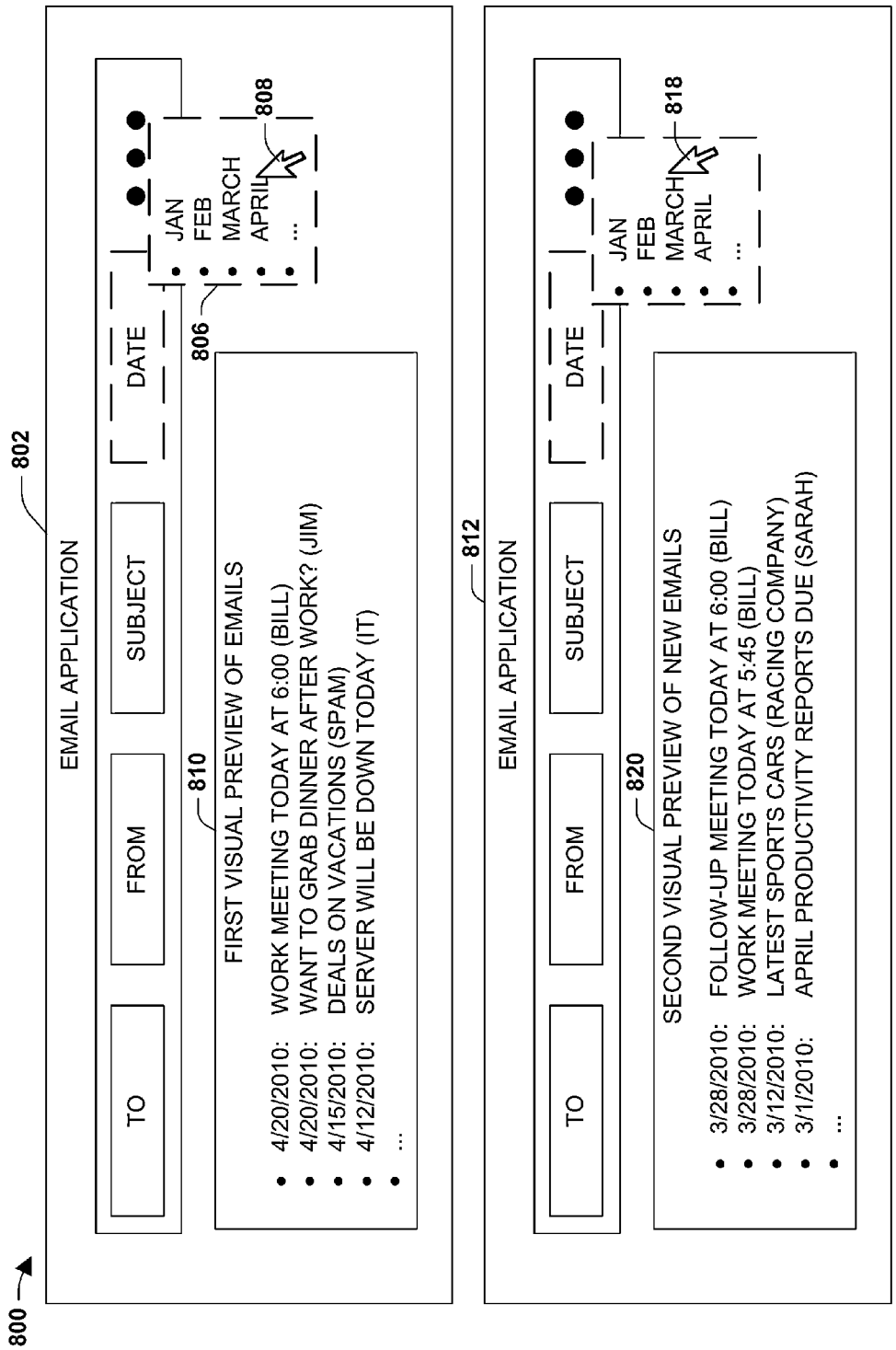
FIG. 8 is an illustration of an example of an email application in a first state after an identifier is referenced, and the email application in a second state after a new referenced identifier is referenced.

FIG. 8 illustrates an example 800 of an email application in a first state 802 after an identifier is referenced, and the email application in a second state 812 after a new referenced identifier is referenced. The email application may comprise a ribbon user interface that may allow the user to filter and/or search emails. The ribbon user interface may comprise gallery menus (e.g., date gallery). A gallery menu may comprise a set of identifiers (e.g., set of date identifiers 806) that may be referenced by user input to view visual previews; unreferenced by user input to remove visual previews; and/or selected by user input to perform a particular search for persisted search results.

In one example, a user may desire a particular email. The user may begin the search by hovering over the date gallery with a cursor to view the set of date identifiers 806. The user may reference 808 identifier (Date="April") by hovering over the identifier (Date="April"). In response to the user input referencing the identifier (Date="April"), a first visual preview of emails 810 may be presented. In this way, the email application may be in the first state 802, where the first visual preview of emails 810 is presented based upon the user referencing the identifier (Date="April").

Subsequently, the user may determine that the desired email was not received in April, but may have been received in March. Thus, the user may reference 818 a new identifier (Date="March") within the date gallery. A second visual preview of new emails 820 may be generated using the new identifier (Date="March") as search criteria for new emails. The first visual preview of emails 810 may be replaced with the second visual preview of new emails 820. In this way, the email application may be in the second state 812, where the first visual preview of emails 810 is replaced with the second preview of emails 820 based upon the user referencing the new identifier (Date="March").

Figure 9:
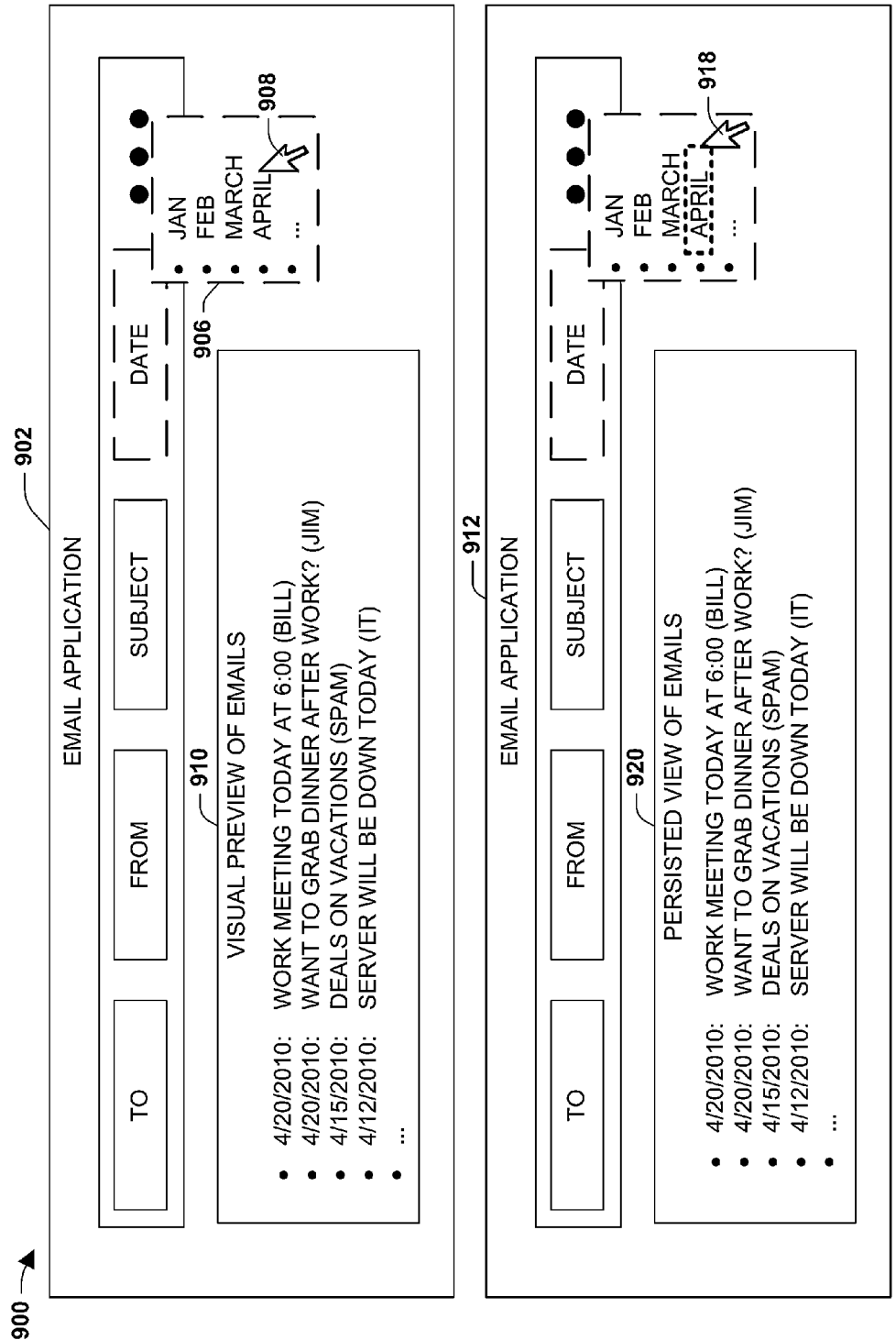
FIG. 9 is an illustration of an example of an email application in a first state after an identifier is referenced, and the email application in a second state after the identifier is selected.

FIG. 9 illustrates an example 900 of an email application in a first state 902 after an identifier is referenced, and the email application in a second state 912 after the identifier is selected. The email application may comprise a ribbon user interface that may allow the user to filter and/or search emails. The ribbon user interface may comprise gallery menus (e.g., date gallery). A gallery menu may comprise a set of identifiers (e.g., set of date identifiers 906) that may be referenced by user input to view visual previews; unreferenced by user input to remove visual previews; and/or selected by user input to perform a particular search for persisted search results.

In one example, a user may desire a particular email. The user may begin the search by hovering over the date gallery with a cursor to view the set of date identifiers 906. The user may reference 908 identifier (Date="April") by hovering over the identifier (Date="April"). In response to the user input referencing the identifier (Date="April"), a first visual preview of emails 910 may be presented. In this way, the email application may be in the first state 902, where the first visual preview of emails 910 is presented based upon the user referencing the identifier (Date="April").

Subsequently, the user may determine that the visual preview of emails 910 comprises the desired email. Thus, the user may select 918 the identifier (Date="April"). In response to the selection, a persisted view of emails 920 may be generated. For example, a full search using the identifier (Date="April") may be performed to retrieve a persisted view of search results. The visual preview of emails 910 may be replaced with the persisted view of emails 920. In this way, the email application may be in the second state 912, where the first visual preview of emails 910 is replaced with the persisted view of emails 920 based upon the user selecting the identifier (Date="April").

Figure 10:
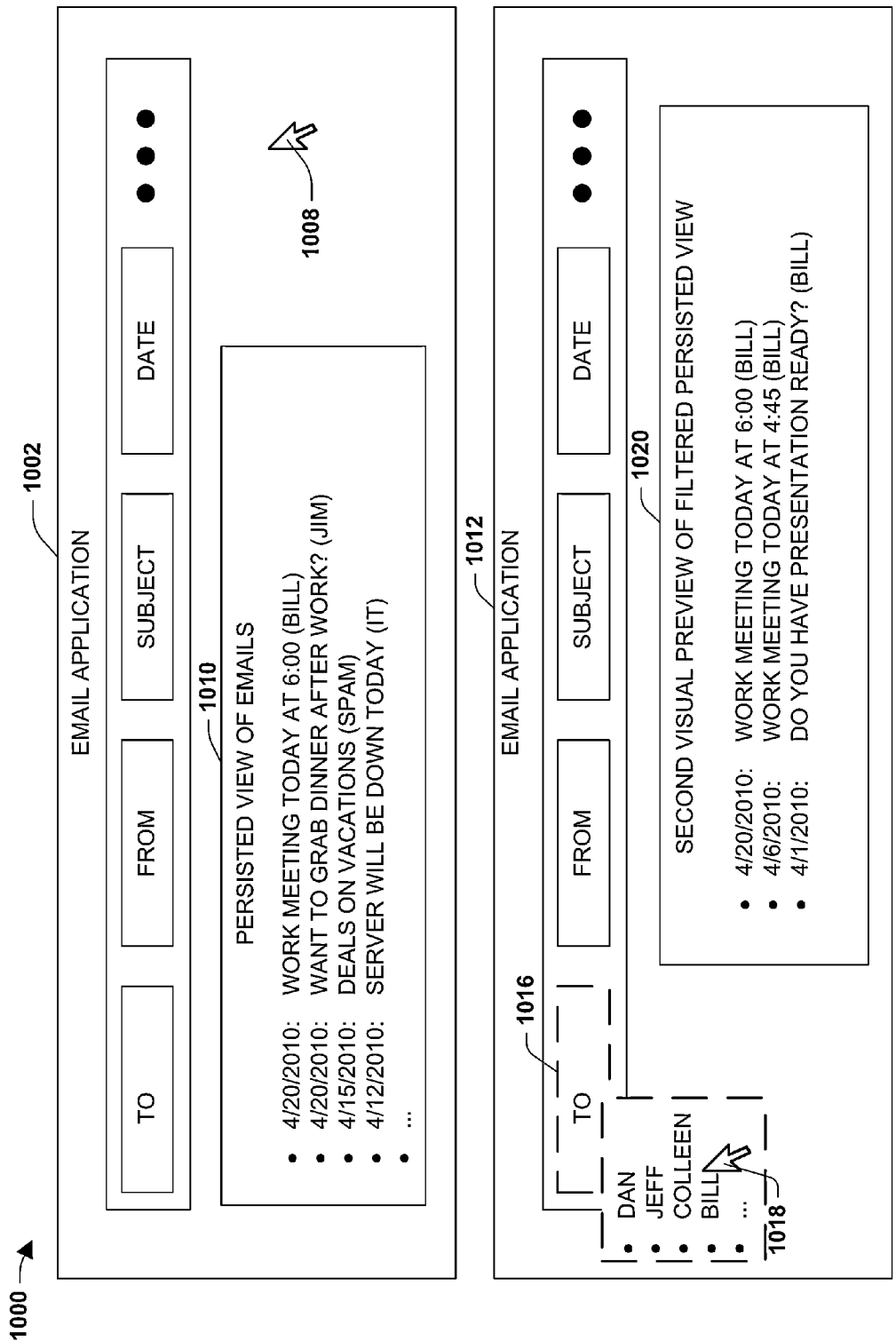
FIG. 10 is an illustration of an example of an email application in a first state after an identifier is selected, and the email application in a second state after a new referenced identifier is referenced.

FIG. 10 illustrates an example 1000 of an email application in a first state 1002 after an identifier is selected, and the email application in a second state 1012 after a new referenced identifier is referenced. The email application may comprise a ribbon user interface that may allow the user to filter and/or search emails. The ribbon user interface may comprise gallery menus (e.g., date gallery and/or to gallery). A gallery may comprise a set of identifiers (e.g., a set of date identifiers 1006, a set of to identifiers 1016, etc.) that may be referenced by user input to view visual previews; unreferenced by user input to remove visual previews; and/or selected by user input to perform a particular search for persisted search results.

In one example, a user may have selected a particular identifier, such as identifier (Date="April"). In response to the selection, a persisted view of emails 1010 may have been presented within the email application as illustrated in the first state 1002. The persisted view of emails 1010 may remain presented while the user performs other particular actions, such as moving 1008 a cursor out of the ribbon user interface, interacting with emails, navigating the email application, etc.

Subsequently, the user may determine that the persisted view of emails 1010 may comprise too many emails to sift through. Thus, the user may reference new identifiers to filter the persisted view of emails 1010. For example, the user may reference 1018 a new identifier (To="Bill") by hovering over the new identifier (To="Bill"). In response to the user input referencing the new identifier (To="Bill"), the persisted view of emails 1010 may be replaced with a second visual preview of the filtered persisted view 1020. The second visual preview of the filtered persisted view 1020 may comprise emails received in April from Bill. In this way, the email application may be in the second state 1012, where the second visual preview of the filtered persisted view 1020 is presented based upon the user referencing the new identifier (To="Bill") after a persisted view of emails 1010 was presented.

Figure 11:
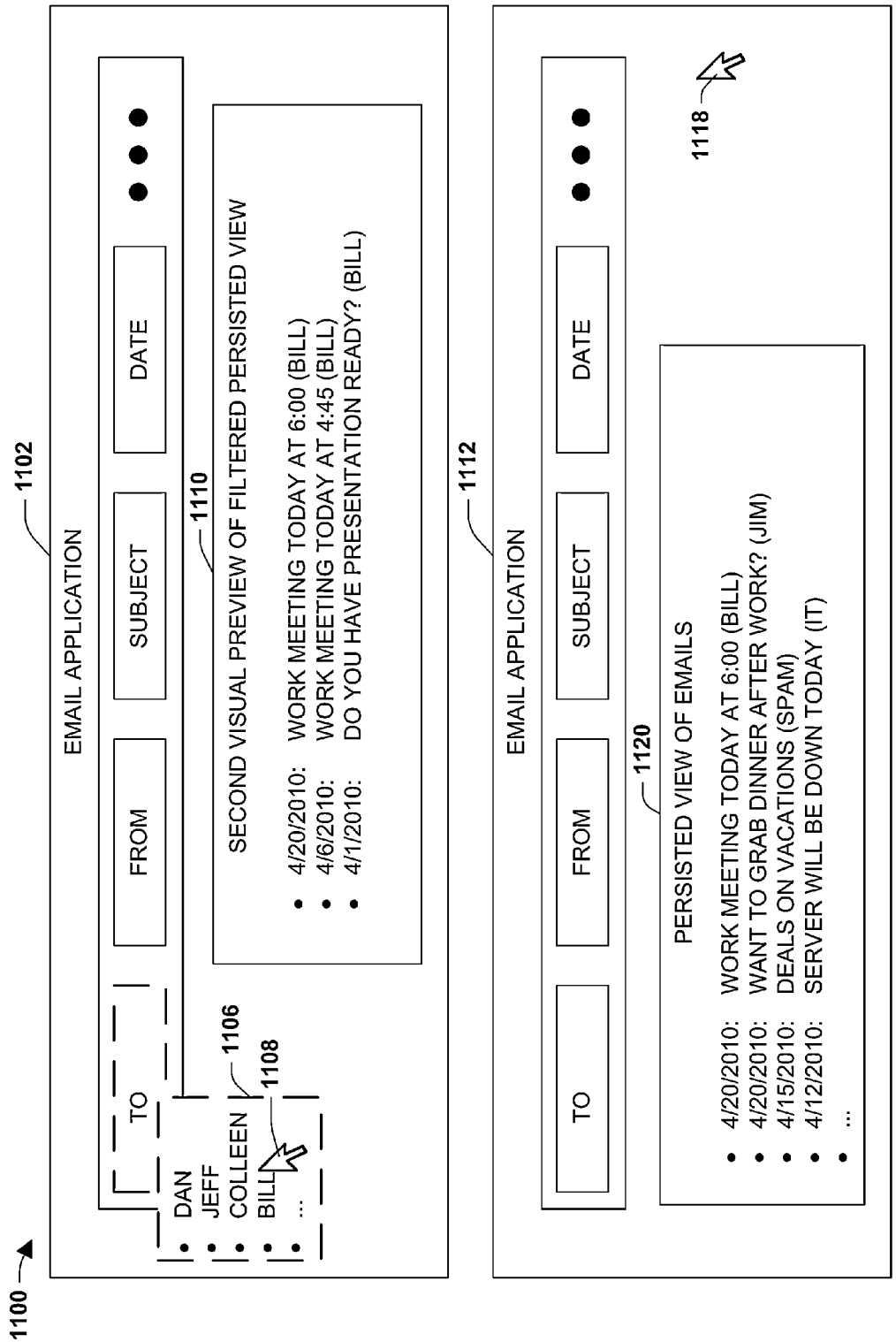
FIG. 11 is an illustration of an example of an email application in a first state after a new identifier is referenced, and the email application in a second state after the new referenced identifier is unreferenced.

FIG. 11 illustrates an example 1100 of an email application in a first state 1102 after a new identifier is referenced, and the email application in a second state 1112 after the new referenced identifier is unreferenced. The email application may comprise a ribbon user interface that may allow the user to filter and/or search emails. The ribbon user interface may comprise gallery menus (e.g., to gallery). A gallery menu may comprise a set of identifiers (e.g., set of to identifiers 1106) that may be referenced by user input to view visual previews; unreferenced by user input to remove visual previews; and/or selected by user input to perform a particular search for persisted search results.

In one example, a user may have selected a particular identifier, such as identifier (Date="April"). In response to the selection, a persisted view of emails may have been presented within the email application. Additionally, the user may have subsequently referenced 1108 a new identifier (To="Bill"). In response to the referencing, a second visual preview of the filtered persisted view 1110 may be presented as illustrated in the first state 1102.

Subsequently, the user may determine that the desired email was still received in April, but was not sent by Bill. Thus, the user may unreference 1118 the new identifier (To="Bill") by hovering off the new identifier (To="Bill"), the to gallery, and/or the ribbon user interface. In response to the user input unreferencing the new identifier (To="Bill"), the second visual preview of the filtered persisted view 1110 may be replaced with the persisted view of emails 1120 (the persisted view of emails received in April). In this way, the email application may be in the second state 1112, where the second visual preview of the filtered persisted view 1110 comprising emails received in April from Bill is replaced by the persisted view of emails 1120 comprising emails from anyone during April.

Figure 12:
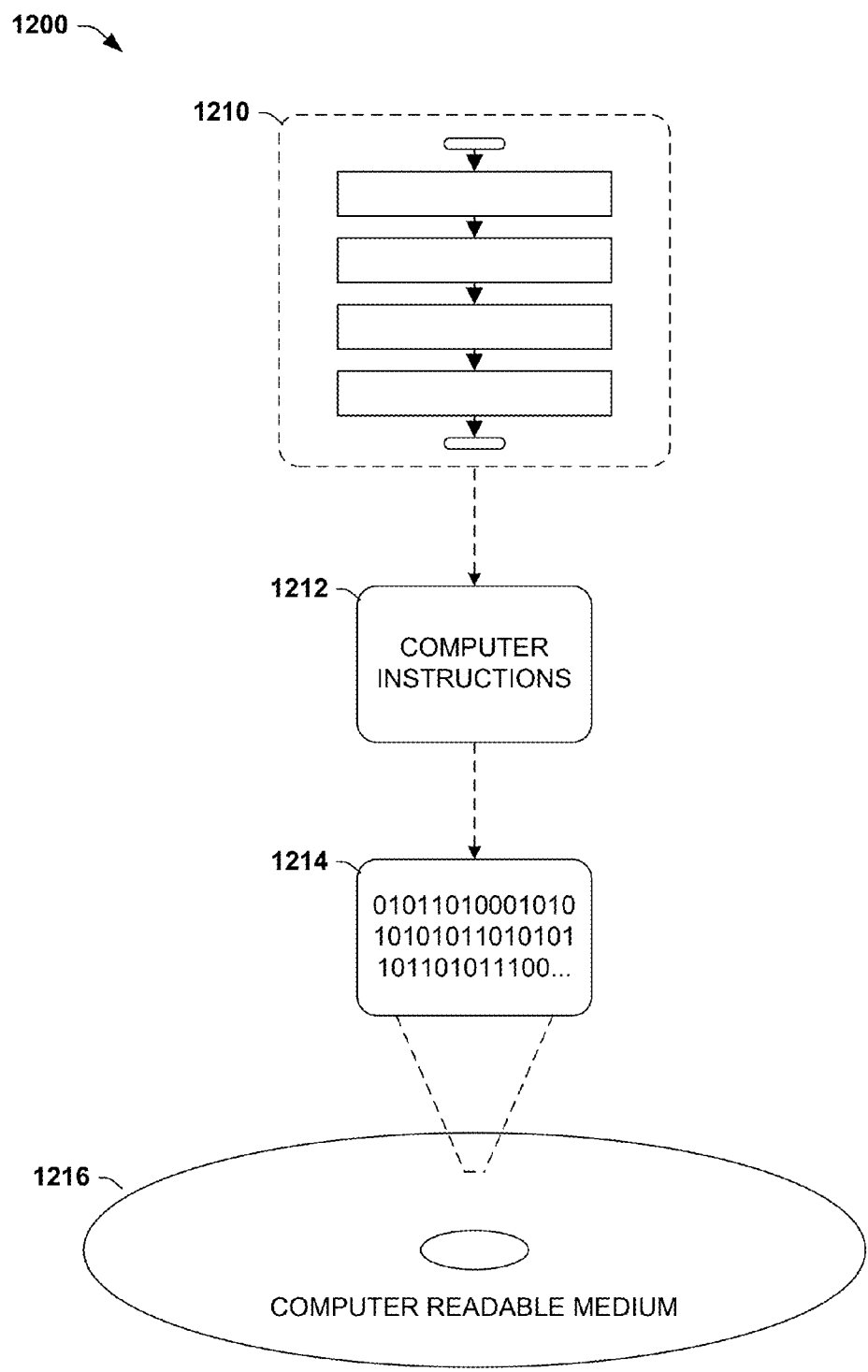
FIG. 12 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 12, wherein the implementation 1200 comprises a computer-readable medium 1216 (e.g., a CD-R, DVD-R, or a platter of a hard disk drive), on which is encoded computer-readable data 1214. This computer-readable data 1214 in turn comprises a set of computer instructions 1212 configured to operate according to one or more of the principles set forth herein. In one such embodiment 1200, the processor-executable computer instructions 1212 may be configured to perform a method 1210, such as the exemplary method 100 of FIG. 1 and/or exemplary method 200 of FIG. 2, for example. In another such embodiment, the processor-executable instructions 1212 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 13:
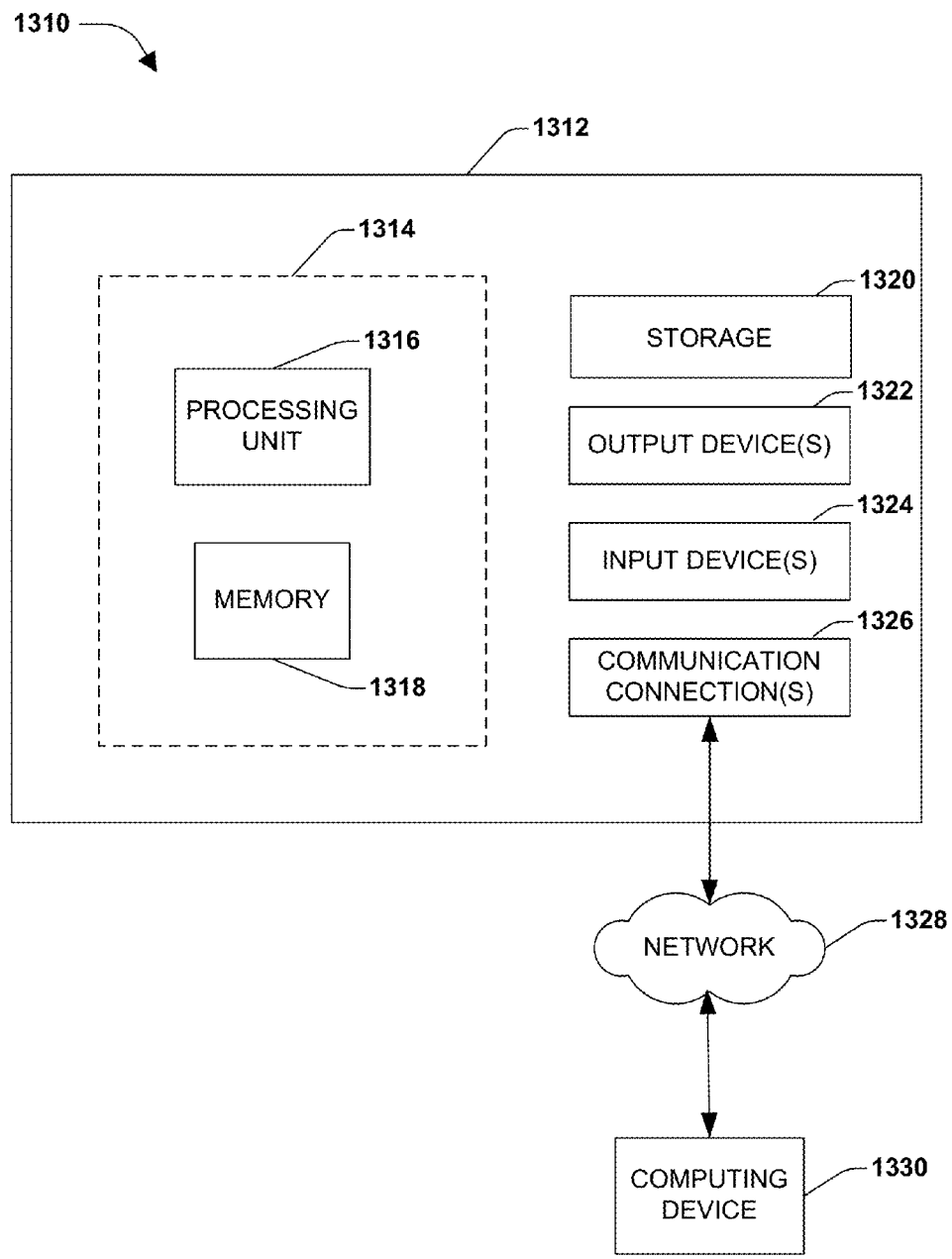
FIG. 13 illustrates an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 1310 comprising a computing device 1312 configured to implement one or more embodiments provided herein. In one configuration, computing device 1312 includes at least one processing unit 1316 and memory 1318. Depending on the exact configuration and type of computing device, memory 1318 may be volatile (such as RAM, for example), non-volatile (such as ROM, flash memory, etc., for example) or some combination of the two. This configuration is illustrated in FIG. 13 by dashed line 1314.

In other embodiments, device 1312 may include additional features and/or functionality. For example, device 1312 may also include additional storage (e.g., removable and/or non-removable) including, but not limited to, magnetic storage, optical storage, and the like. Such additional storage is illustrated in FIG. 13 by storage 1320. In one embodiment, computer readable instructions to implement one or more embodiments provided herein may be in storage 1320. Storage 1320 may also store other computer readable instructions to implement an operating system, an application program, and the like. Computer readable instructions may be loaded in memory 1318 for execution by processing unit 1316, for example.

The term "computer readable media" as used herein includes computer storage media. Computer storage media includes volatile and nonvolatile, removable and non-removable media implemented in any method or technology for storage of information such as computer readable instructions or other data. Memory 1318 and storage 1320 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1312. Any such computer storage media may be part of device 1312.

Device 1312 may also include communication connection(s) 1326 that allows device 1312 to communicate with other devices. Communication connection(s) 1326 may include, but is not limited to, a modem, a Network Interface Card (NIC), an integrated network interface, a radio frequency transmitter/receiver, an infrared port, a USB connection, or other interfaces for connecting computing device 1312 to other computing devices. Communication connection(s) 1326 may include a wired connection or a wireless connection. Communication connection(s) 1326 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1312 may include input device(s) 1324 such as keyboard, mouse, pen, voice input device, touch input device, infrared cameras, video input devices, and/or any other input device. Output device(s) 1322 such as one or more displays, speakers, printers, and/or any other output device may also be included in device 1312. Input device(s) 1324 and output device(s) 1322 may be connected to device 1312 via a wired connection, wireless connection, or any combination thereof. In one embodiment, an input device or an output device from another computing device may be used as input device(s) 1324 or output device(s) 1322 for computing device 1312.

Components of computing device 1312 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1312 may be interconnected by a network. For example, memory 1318 may be comprised of multiple physical memory units located in different physical locations interconnected by a network.

Those skilled in the art will realize that storage devices utilized to store computer readable instructions may be distributed across a network. For example, a computing device 1330 accessible via a network 1328 may store computer readable instructions to implement one or more embodiments provided herein. Computing device 1312 may access computing device 1330 and download a part or all of the computer readable instructions for execution. Alternatively, computing device 1312 may download pieces of the computer readable instructions, as needed, or some instructions may be executed at computing device 1312 and some at computing device 1330.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for providing a live preview of search results, comprising:
presenting a first visual preview comprising one or more objects associated with a referenced identifier, the one or more objects having been retrieved and presented in response to a search associated with the identifier;

receiving user input during the presentation of the first visual preview;

responsive to receiving the user input:
  determining whether the received user input corresponds to unreferencing the referenced identifier, referencing a new identifier, or selecting the referenced identifier;
  when the user input corresponds to a first gesture unreferencing the referenced identifier, removing the first visual preview such that the one or more objects retrieved in response to a search associated with the identifier and presented in the first visual preview are no longer presented;
  when the user input corresponds to a second gesture selecting the referenced identifier, presenting a persistent view comprising at least the one or more objects retrieved in response to a search associated with the identifier; and
  when the user input corresponds to a third gesture referencing a new identifier, presenting a new search preview by retrieving one or more objects associated with a search using the new identifier as a search criteria and presenting a new preview comprising the one or more objects associated with the search using the new identifier as a search criteria.

2. The method of claim 1, the first gesture corresponding to a hover off action.

3. The method of claim 1, the second gesture corresponding to a click action.

4. The method of claim 1, comprising:
  receiving the user input during a presenting of the first visual preview of the one or more objects.

5. The method of claim 1, comprising:
  retrieving the one or more objects using search criteria.

6. The method of claim 1, the first gesture different than the second gesture.

7. The method of claim 1, the one or more objects corresponding to at least one of emails, photos, music files, web content, hyperlinks, URLs or files.

8. A system for providing a live preview of search results, the system comprising:
  one or more processing units; and
  memory comprising instructions that, when executed by at least one of the one or more processing units, perform a method comprising:
    presenting a first visual preview comprising one or more objects associated with a referenced identifier, the one or more objects having been retrieved and presented in response to a search associated with the identifier;
    receiving user input during the presentation of the first visual preview;
    responsive to receiving the user input:
      determining whether the received user input corresponds to unreferencing the referenced identifier, referencing a new identifier, or selecting the referenced identifier;
      when the user input corresponds to a first gesture unreferencing the referenced identifier, removing the first visual preview such that the one or more objects retrieved in response to a search associated with the identifier and presented in the first visual preview are no longer presented;
      when the user input corresponds to a second gesture selecting the referenced identifier, presenting a persistent view comprising at least the one or more objects retrieved in response to a search associated with the identifier; and
      when the user input corresponds to a third gesture referencing a new identifier, presenting a new search preview by retrieving one or more objects associated with a search using the new identifier as a search criteria and presenting a new preview comprising the one or more objects associated with the search using the new identifier as a search criteria.

9. The system of claim 8, the first gesture corresponding to a hover off action.

10. The system of claim 8, the second gesture corresponding to a click action.

11. The system of claim 8, the method comprising:
  receiving the user input during a presenting of the first visual preview of the one or more objects.

12. The system of claim 8, the method comprising:
  retrieving the one or more objects using search criteria.

13. The system of claim 8, the first gesture different than the second gesture.

14. The system of claim 8, the one or more objects corresponding to at least one of emails, photos, music files, web content, hyperlinks, URLs or files.

15. A computer program product for providing a live preview of search results, the computer program product comprising one or more computer readable storage devices comprising instructions that when executed, perform a method comprising:
  receiving a first user input corresponding to a first gesture with respect to an identifier;
  retrieving one or more objects using the identifier as search criteria;
  presenting a first visual preview of the one or more objects;
  while the first visual preview is being presented, receiving a second user input; and
  responsive to receiving the second user input:
    determining whether the second user input corresponds to unreferencing the referenced identifier, referencing a new identifier, or selecting the referenced identifier;
    when the second user input corresponds to a second gesture unreferencing the referenced identifier, removing the first visual preview such that the one or more objects presented in the first visual preview are no longer presented,
    when the second user input corresponds to a third gesture selecting the referenced identifier, presenting a persistent view comprising at least the one or more objects retrieved using the identifier as search criteria; and
    when the second user input corresponds to a third gesture referencing a new identifier, presenting a new search preview by retrieving one or more objects associated with a search using the new identifier as a search criteria and presenting a new preview comprising the one or more objects associated with the new identifier.

16. The computer program product of claim 15, the first gesture corresponding to a hover over action.

17. The computer program product of claim 16, the third gesture corresponding to a click action.

18. The computer program product of claim 16, the second gesture corresponding to a hover off action.

19. The computer program product of claim 15, the method comprising:

presenting a set of one or more identifiers within the persistent view;

receiving a third user input corresponding to a fourth gesture with respect to a second identifier of the set;

filtering the one or more objects based upon the second identifier to generate a second visual preview comprising a second set of objects comprising at least some of the one or more objects; and presenting the second visual preview of the second set of objects.

20. The computer program product of claim 19, the method comprising:

receiving a fourth user input unreferencing the second identifier; and removing the second visual preview, such that the second set of objects is not presented.

* * * * *